(12) United States Patent
Yasuda et al.

(10) Patent No.: US 12,065,713 B2
(45) Date of Patent: Aug. 20, 2024

(54) GRAIN-ORIENTED ELECTRICAL STEEL SHEET

(71) Applicant: NIPPON STEEL CORPORATION, Tokyo (JP)

(72) Inventors: Masato Yasuda, Tokyo (JP); Takeo Aramaki, Tokyo (JP); Shinya Yano, Tokyo (JP); Yoshihiro Arita, Tokyo (JP); Takashi Kataoka, Tokyo (JP); Kenichi Murakami, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 215 days.

(21) Appl. No.: 17/761,055

(22) PCT Filed: Sep. 17, 2020

(86) PCT No.: PCT/JP2020/035339
§ 371 (c)(1),
(2) Date: Mar. 16, 2022

(87) PCT Pub. No.: WO2021/054409
PCT Pub. Date: Mar. 25, 2021

(65) Prior Publication Data
US 2022/0340991 A1 Oct. 27, 2022

(30) Foreign Application Priority Data

Sep. 18, 2019 (JP) .................................. 2019-169416

(51) Int. Cl.
*H01F 1/147* (2006.01)
*C21D 6/00* (2006.01)
(Continued)

(52) U.S. Cl.
CPC ............... *C21D 9/46* (2013.01); *C21D 6/002* (2013.01); *C21D 6/005* (2013.01); *C21D 6/008* (2013.01);
(Continued)

(58) Field of Classification Search
None
See application file for complete search history.

(56) References Cited

U.S. PATENT DOCUMENTS

| 4,750,949 A | 6/1988 | Kobayashi et al. |
| 4,770,720 A | 9/1988 | Kobayashi et al. |

(Continued)

FOREIGN PATENT DOCUMENTS

| CN | 101395284 A | 3/2009 |
| EP | 3 395 961 A1 | 10/2018 |

(Continued)

*Primary Examiner* — Kim S. Horger
(74) *Attorney, Agent, or Firm* — Birch, Stewart, Kolasch & Birch, LLP

(57) ABSTRACT

A grain-oriented electrical steel sheet comprises a base steel sheet and a glass coating that is formed on the surface of the base steel sheet, and is characterized in that: the base steel sheet contains as chemical components, in mass %, 0.010% or less of C, from 2.00% to 4.00% of Si, from 0.05% to 1.00% of Mn, from 0.010% to 0.065% of Al, 0.004% or less of N and 0.010% or less of S, with the balance of Fe and impurities, wherein the oxygen concentration in the glass coating and the base steel sheet is 2,500 ppm or less; and if $I_{Al\_1}$ is the first peak intensity of Al and $I_{Al\_2}$ is the second peak intensity of Al in the concentration profile of Al, the relationship of mathematical formula (1) $I_{Al\_1} < I_{Al\_2}$ is satisfied.

2 Claims, 4 Drawing Sheets

(51) Int. Cl.
  *C21D 8/00* (2006.01)
  *C21D 8/12* (2006.01)
  *C21D 9/46* (2006.01)
  *C22C 38/00* (2006.01)
  *C22C 38/04* (2006.01)
  *C22C 38/06* (2006.01)
  *C22C 38/08* (2006.01)
  *C22C 38/12* (2006.01)
  *C22C 38/16* (2006.01)
  *C22C 38/34* (2006.01)

(52) U.S. Cl.
  CPC ........... *C21D 8/005* (2013.01); *C21D 8/1222* (2013.01); *C21D 8/1233* (2013.01); *C21D 8/1283* (2013.01); *C22C 38/001* (2013.01); *C22C 38/002* (2013.01); *C22C 38/04* (2013.01); *C22C 38/06* (2013.01); *C22C 38/08* (2013.01); *C22C 38/12* (2013.01); *C22C 38/16* (2013.01); *C22C 38/34* (2013.01); *H01F 1/147* (2013.01); *C22C 2202/02* (2013.01)

(56) References Cited

U.S. PATENT DOCUMENTS

| | | |
|---|---|---|
| 2009/0032142 A1 | 2/2009 | Kumano et al. |
| 2010/0055481 A1 | 3/2010 | Kubo et al. |
| 2018/0010206 A1* | 1/2018 | Kwon .................. C21D 8/1244 |
| 2020/0354809 A1 | 11/2020 | Yasuda et al. |
| 2021/0082606 A1 | 3/2021 | Mogi et al. |

FOREIGN PATENT DOCUMENTS

| | | |
|---|---|---|
| JP | 61-117284 A | 6/1986 |
| JP | 81-117218 A | 6/1986 |
| JP | 6-57335 A | 3/1994 |
| JP | 8-134660 A | 5/1996 |
| JP | 2000-129355 A | 5/2000 |
| JP | 2000-204450 A | 7/2000 |
| JP | 2003-129135 A | 5/2003 |
| JP | 2013-510239 A | 3/2013 |
| JP | 2018-66061 A | 4/2018 |
| WO | WO2008/082853 A1 | 5/2008 |
| WO | WO2010/147009 A1 | 12/2010 |
| WO | WO2019/146697 A1 | 8/2019 |
| WO | WO2019/151397 A1 | 8/2019 |

* cited by examiner

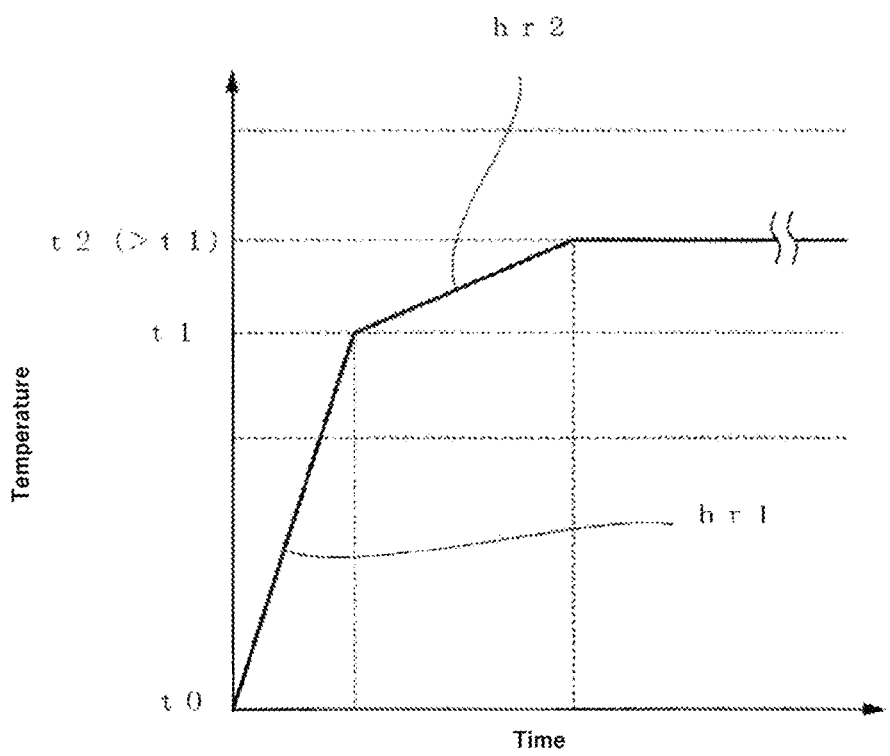

GRAIN-ORIENTED ELECTRICAL STEEL SHEET

TECHNICAL FIELD

The present invention relates to grain-oriented electrical steel sheets.

BACKGROUND ART

Since grain-oriented electrical steel sheets are mainly used as iron cores of transformers, it is desired that their magnetization characteristics are good, and especially iron loss is low. For that purpose, it is important to highly align the crystal grains accumulated in the {110} <001> orientation, to contain Si to increase the intrinsic resistance, and to reduce impurities.

However, there is a limit in reduction of iron loss by the control of crystal orientation and steel sheet component, and a technique for subdividing a width of magnetic domains to reduce the iron loss (hereinafter, also referred to as "magnetic domain control technology") has been developed. The magnetic domain control technology can be broadly divided into non-heat-resistant and heat-resistant technologies.

As a non-heat-resistant magnetic domain control technique, for example, as disclosed in Patent Documents 1 and 2, a method of forming a linear thermal strain region at the surface layer of a steel sheet by irradiating the steel sheet with a laser beam is known. In this method, the magnetic domain width is narrowed by the thermal strain region, so that iron loss is reduced. However, since the strain of the heat strain region is released by heat treatment, the grain-oriented electrical steel sheet to which the non-heat-resistant magnetic domain control technology is carried out, cannot be used for a transformer that requires a strain removal annealing after processing such as winding iron core. Therefore, there is a problem that the usage of the grain-oriented electrical steel sheet is limited.

On the other hand, grain-oriented electrical steel sheets to which the heat-resistant magnetic domain control technology is carried out, have the advantage of not being restricted by their use. As such a heat-resistant magnetic domain control technique, for example, a method of forming a groove by electrolytic etching as disclosed in Patent Document 3 is known. In this method, for example, a glass coating is first formed on the surface of the steel sheet after secondary recrystallization. Then, the glass coating on the surface of the steel sheet is linearly removed by a laser or a mechanical method, and a groove is formed in the portion where the base iron is exposed by etching. Therefore, this method complicates the process steps and makes the manufacturing cost increased. Furthermore, there is a limit to the processing speed.

In addition, as disclosed in Patent Document 4, a method of forming a groove on the surface of a steel sheet by a mechanical tooth mold press is known. However, Si is often added to the electrical steel sheet in an amount of about 3% by mass for the purpose of increasing electrical resistance. Since such an electrical steel sheet is very hard, the method disclosed in Patent Document 4 may cause wear and damage of the tooth profile. Further, the groove depth may vary, and as a result, the iron loss improving effect may also vary.

Further, there is also a problem that the heat-resistant magnetic domain control technology described above cannot have a sufficient iron loss reduction effect as compared with the non-heat-resistant magnetic domain control technology that introduces a thermal strain region into the surface layer of the steel sheet by irradiating the steel sheet with a laser beam. Patent Documents 5 and 6 disclose a technique for devising the shape of the steel sheet surface and the groove shape as a heat-resistant magnetic domain control technique, but a fundamental solution to each of the above problems posed by the heat-resistant magnetic domain control technique has not been reached.

By the way, in order to sufficiently obtain the effect of reducing iron loss by subdividing the magnetic domains as described above, a tension exerted on the steel sheet by the insulating coating or the glass coating (hereinafter, also referred to as "coating tension") is extremely important. As the insulating coating, for example, one formed by applying an aqueous coating solution containing a phosphate salt and a colloidal silica to a steel sheet is known. As the glass coating, which will be described in detail later, for example, a glass coating comprising an oxide containing forsterite as a main component is known.

Patent Documents 7 and 8 disclose a technique for increasing the tension of the glass coating. Specifically, Patent Document 7 discloses an electrical steel sheet wherein 5% or more of spinel (for example, $MgAl_2O_4$) is comprised in the forsterite (that is, in the glass coating). Further, Patent Document 8 discloses an electrical steel sheet in which the luminous intensities of Al and Fe obtained by glow discharge emission analysis satisfy a predetermined condition. Further, Patent Document 9 discloses a technique for improving the adhesion of the glass coating (preventing peeling during bending in the transformer manufacturing). Specifically, Patent Document 9 discloses an electrical steel sheet in which the luminous intensity of B obtained by glow discharge emission analysis satisfies a predetermined condition. However, although the techniques disclosed in Patent Documents 7 to 9 can be expected to improve the tension or adhesion of the glass coating, these techniques alone cannot obtain the magnetic domain subdivision effect. That is, the techniques disclosed in Patent Documents 7 to 9 are premised on the heat-resistant magnetic domain control technique as described above. Therefore, even with these techniques, the problem cannot be adequately solved that the iron loss reduction effect cannot be sufficiently obtained.

PRIOR ART DOCUMENT

Patent Document

Patent Document 1: Japanese Unexamined Patent Publication (Kokai) No. 6-57335
Patent Document 2: Japanese Unexamined Patent Publication (Kokai) No. 2003-129135
Patent Document 3: Japanese Unexamined Patent Publication (Kokai) No. 61-117284
Patent Document 4: Japanese Unexamined Patent Publication (Kokai) No. 61-117218
Patent Document 5: International Publication WO 2010/147009
Patent Document 6: Japanese Unexamined Patent Publication (Kohyo) No. 2013-510239
Patent Document 7: Japanese Unexamined Patent Publication (Kokai) No. 8-134660
Patent Document 8: Japanese Unexamined Patent Publication (Kokai) No. 2000-204450
Patent Document 9: International Publication WO 2019/146697

SUMMARY OF INVENTION

Technical Problem

As described above, the heat-resistant magnetic domain control technology has a problem that the iron loss reduction effect cannot be sufficiently obtained. On the other hand, although the non-heat-resistant magnetic domain control technology can enhance the iron loss reduction effect as compared with the heat-resistant magnetic domain control technology, further improvement of the iron loss reduction effect has been required.

The present invention has been developed in view of the above circumstances, and it is an object of the present invention to provide a grain-oriented electrical steel sheet wherein the iron loss before magnetic domain control is further improved, and wherein even in heat-resistant magnetic domain control in which a sufficient iron loss improving effect is not likely to be obtained, the iron loss is sufficiently improved.

Solution to Problem

The present inventors have made extensive studies to solve the above problems. Specifically, the present inventors repeated experiments in which heat-resistant magnetic domain control was performed on grain-oriented electrical steel sheets having the same magnetic flux density and various iron loss characteristics before magnetic domain control as well. As a result, the present inventors have found that the better the iron loss in the state before the magnetic domain control, the better the iron loss after the magnetic domain control. Then, as a result of investigating the characteristics of the steel sheet having a good iron loss before the magnetic domain control, the present inventors have found that such a steel sheet has developed a structure in which the glass coating is fitted into the surface layer of the base steel sheet (hereinafter, referred to as "glass coating fitting structure." The present inventor came up with the present invention based on such findings. The gist of the present invention is as follows.

According to a certain viewpoint of the present invention, a grain-oriented electrical steel sheet is provided which comprises a base steel sheet and a glass coating that is formed on the surface of the base steel sheet, and is characterized in that: the base steel sheet contains as chemical components, in mass %, 0.010% or less of C, from 2.00% to 4.00% of Si, from 0.05% to 1.00% of Mn, from 0.010% to 0.065% or less of Al, 0.004% or less of N and 0.010% or less of S, with the balance being made up of Fe and impurities; the oxygen concentration in the glass coating and the base steel sheet is 2,500 ppm or less; and the concentration profile of Al obtained by glow discharge optical emission spectrometry (GDS) has at least two peaks, in which each Al peak is set as the first peak and the second peak in order from the side closer to the surface of the glass coating, and when $I_{Al\_1}$ is the first peak intensity of Al and $I_{Al\_2}$ is the second peak intensity of Al, formula (1) is satisfied.

$$I_{Al\_1} < I_{Al\_2} \quad \text{Formula (1)}$$

Here, in the vertical cross section parallel to the rolling direction of the surface layer portion of the base steel sheet, a region within the range from the surface of the glass coating to the depth of 10 μm in the direction to the center of the sheet thickness may comprise Al-containing precipitates having a circular equivalent diameter of 1 μm or more and being scattered in the rolling direction at an average frequency of 50 pieces/mm or more. Unless otherwise specified in the present specification, the vertical cross section refers to a cross section parallel to the normal direction of the surface of the steel sheet.

Advantageous Effect of Invention

According to the above viewpoint of the present invention, if $I_{Al\_1}$ is the first peak intensity of Al and $I_{Al\_2}$ is the second peak intensity of Al, the relationship of the mathematical formula (1) is satisfied. Although the details will be described later, when the condition of the mathematical formula (1) is satisfied, the fitting structure of the glass coating is greatly developed, and a large amount of Al precipitates are formed in the surface layer portion of the base steel sheet. Since these Al precipitates form magnetic poles, the magnetic domain subdivision effect can be sufficiently enhanced by these Al precipitates. A further magnetic domain control may be applied to the grain-oriented electrical steel sheet according to the present invention. Therefore, according to the present invention, the iron loss before the magnetic domain control is further improved, and the iron loss improving effect can be sufficiently obtained even in the heat-resistant magnetic domain control in which a sufficient iron loss improving effect is not likely to be obtained.

BRIEF DESCRIPTION OF DRAWINGS

FIG. 5 is a graph illustrating an example of a temperature rise pattern in the decarburization annealing of the present embodiment.

DESCRIPTION OF EMBODIMENTS

1. Outline of the Present Invention

Hereinafter, preferred embodiments of the present invention will be described in detail with reference to the accompanying drawings. First, the outline of the present invention will be described. The present inventors have diligently studied a technique for promoting magnetic domain subdivision in order to further reduce iron loss. When magnetic domains are subdivided, a width of the magnetic domains becomes narrow. When the magnetic domain width is narrowed, a moving distance of the domain wall when the steel sheet is magnetized is smaller, and thus the energy loss when the domain wall is moved is reduced. That is, iron loss is re duce d.

Here, the subdivision of magnetic domains can be realized by generating new magnetic poles in the surface layer portion of the base steel sheet. More specifically, such magnetic poles increase a magnetostatic energy of the surface layer portion of the base steel sheet. Then, in the surface layer portion of the base steel sheet, a new 180° domain wall is generated in order to reduce the magnetostatic energy. As a result, the magnetic domains are subdivided. In other words, the magnetic domain width becomes narrower.

As mentioned above, it is necessary to generate new magnetic poles for magnetic domain subdivision. Specifically, it is necessary to build an interface made of a substance having a magnetic permeability different from that of the base steel sheet at the surface layer portion of the base steel sheet.

Therefore, the present inventors examined fitting the glass coating into the surface layer portion of the base steel sheet. This is because the glass coating fitting structure forms magnetic poles at the surface layer portion of the base steel sheet, so that magnetic domain subdivision can be realized. Although the details will be described later, the fitting structure of the glass coating contains Al precipitates, by which the magnetic poles are formed.

The present inventors repeated studies for maximizing the effect of magnetic domain subdivision by the fitting structure of the glass coating, and found that the fitting structure was controlled by forming a glass coating satisfying a predetermined condition on the surface of the base steel sheet and that the magnetic domain subdivision effect can be maximized.

Figure 1:
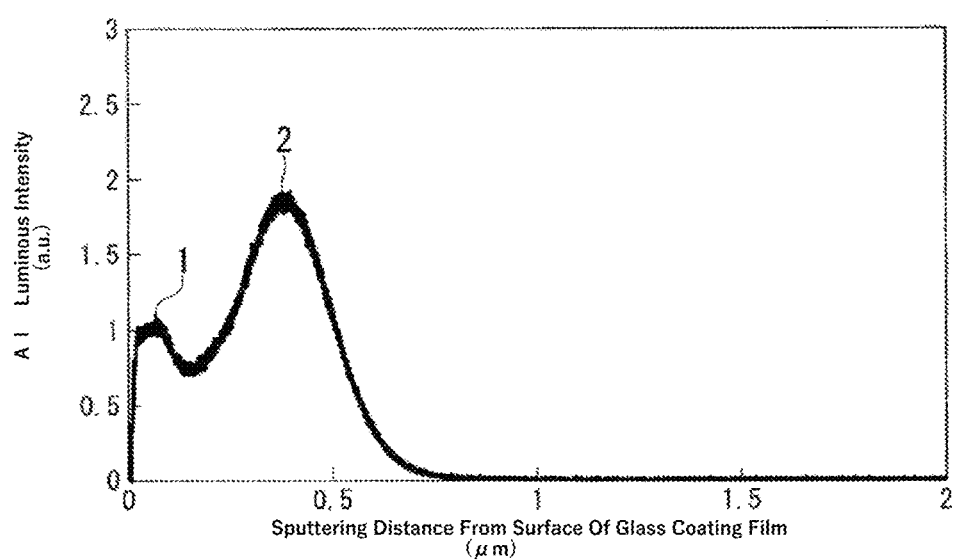
FIG. 1 is a graph showing an example of an Al concentration profile obtained by performing glow discharge optical emission analysis (GDS) on a grain-oriented electrical steel sheet according to the present embodiment.
Figure 2:
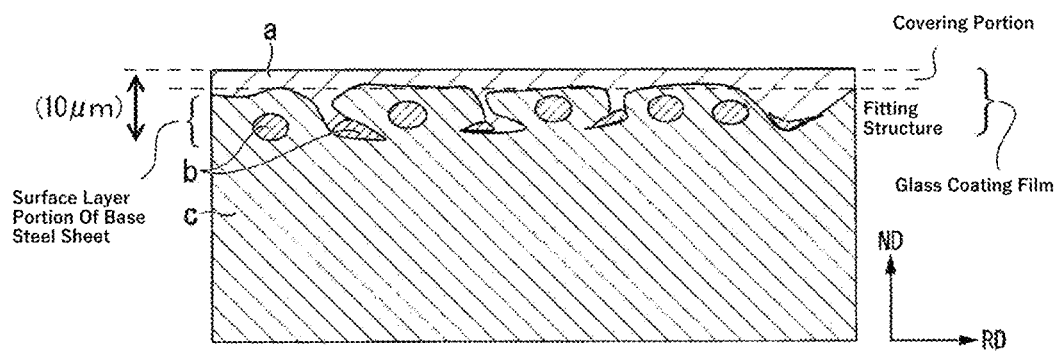
FIG. 2 is a cross-sectional view schematically showing a vertical cross section parallel to the rolling direction of a grain-oriented electrical steel sheet according to the present embodiment.
Figure 3:
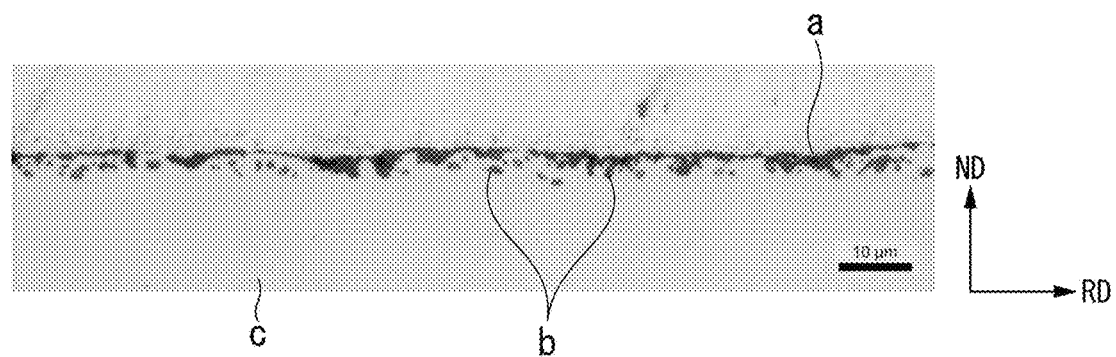
FIG. 3 is an example of a photograph taken with an optical microscope of a cross section parallel to the rolling direction of a grain-oriented electrical steel sheet according to the present embodiment.

Specifically, the oxygen concentration contained in the glass coating and the base steel sheet is set to 2500 ppm or less. Further, in the concentration profile of Al obtained by performing glow discharge optical emission analysis (GDS) on the grain-oriented electrical steel sheet, as shown in FIG. 1, when the intensity of the first peak 1 of Al (first peak intensity) is set to $I_{Al\_1}$, and the intensity of the second peak 2 of Al (second peak intensity) is set to $I_{Al\_2}$, the structure of the glass coating is controlled such that the relationship of $I_{Al\_1} < I_{Al\_2}$ (mathematical formula (1)) is satisfied. As shown in FIGS. 2 and 3, in the vertical cross section parallel to the rolling direction of the surface layer portion of the base steel sheet c), a region within the range of 10 μm from the surface of the glass coating a) toward the center of the sheet thickness, precipitates b) containing Al having a circular equivalent diameter of 1 μm or more are preferably scattered in the rolling direction at an average frequency of 50 pieces/mm or more. Hereinafter, the present embodiment will be described in detail.

2. Configuration of Grain-oriented Electrical Steel Sheet

2-1. Overall Configuration

The grain-oriented electrical steel sheet according to the present embodiment includes a base steel sheet and a glass coating formed on the surface of the base steel sheet. An insulating film may be further formed on the surface of the glass coating. The glass coating has a fitting structure that fits into the base steel sheet, and the fitting structure is very well developed. That is, the fitting structure has a complicated three-dimensional network structure. Therefore, the glass coating is classified into a covering portion that covers most of the surface layer of the base steel sheet and a fitting structure that is fitted into the inside of the surface layer portion of the base steel sheet from the covering portion. Further, the fitting structure contains a large amount of Al-containing precipitates.

FIGS. 2 and 3 show an example of a vertical cross section parallel to the rolling direction of the grain-oriented electrical steel sheet according to the present embodiment. FIG. 2 is a schematic view, and FIG. 3 is a cross-sectional microscopic photograph. ND indicates the sheet thickness direction (normal direction of the steel sheet surface), and RD indicates the rolling direction.

In these examples, the grain-oriented electrical steel sheet includes a base steel sheet c) and a glass coating a) formed on the surface of the base steel sheet c). The glass coating a) has a fitting structure that fits into the base steel sheet c), and the fitting structure is much developed. The fitting structure contains Al precipitates b). Although Al precipitates appear to be scattered in FIGS. 2 and 3, the Al precipitates exist not only on the plane of the paper surface (that is, on the cross section parallel to the rolling direction of the steel sheet) as shown in FIGS. 2 and 3, but also actually extend in a direction intersecting the paper surfaces of FIGS. 2 and 3 (for example, perpendicular to the paper surface) (that is, in the sheet width direction of the steel sheet), and has a three-dimensional network structure connecting to the covering portion. Further, in FIGS. 2 and 3, the fitting structure generally appears to fit from the covering portion toward the surface layer portion of the base steel sheet (that is, extends in the sheet thickness direction), but the fitting structure may extend in the rolling direction and the sheet width direction. When observing the vertical cross section of this portion, a long fitting structure is observed from the left side to the right side (in the rolling direction and the sheet width direction). Details of the fitting structure and Al precipitates will be described later. The covering portion in the glass coating is a portion that covers most of the surface layer of the base steel sheet, and is a portion that is connected to the fitting structure that fits into the inside of the surface layer portion of the base steel sheet. The covering portion and the fitting structure can be classified by the Al concentration profile as described later.

2-2. Component Composition of Base Steel Sheet

The base steel sheet comprises, as chemical composition, as chemical components, C: 0.010% or less, Si: 2.00 to 4.00%, Mn: 0.05 to 1.00%, Al: 0.010 to 0.065% or less, N: 0.004% or less, S: 0.010% or less, based on mass %, and the balance is composed of Fe and impurities. Hereinafter, % related to the component composition will mean mass % with respect to the total mass of the base steel sheet.

C: 0.010% or Less

C is an element that is effective in controlling the primary recrystallized structure, but it adversely affects the magnetic properties. Therefore, it is an element that is removed by decarburization annealing before final annealing. If the C concentration in the final product exceeds 0.010%, C will age-precipitate and the hysteresis loss will deteriorate. Therefore, the C concentration should be 0.010% or less. The C concentration is preferably 0.007% or less, and more preferably 0.005% or less. The lower limit of the C concentration includes 0%, but if the C concentration is reduced to less than 0.0001%, the manufacturing cost will increase significantly. Therefore, 0.0001% is a practical lower limit on the practical steel sheet. In the grain-oriented electrical steel sheets, the C concentration is usually reduced to about 0.001% or less by decarburization annealing.

Si: 2.00 to 4.00%

Si is an element that increases the electrical resistance of the steel sheet and improves its iron loss characteristics. If the Si concentration is less than 2.00%, γ transformation of the iron structure occurs during the final annealing and the crystal orientation of the steel sheet is impaired. Therefore, the Si concentration is set to 2.00% or more. The Si concentration is preferably 2.50% or more, and more preferably 3.00% or more. On the other hand, if the Si concentration exceeds 4.00%, the workability of the grain-oriented electrical steel sheet deteriorates, and cracks occur during rolling. Therefore, the Si concentration is set to 4.00% or less. The Si concentration is preferably 3.50% or less.

Mn: 0.05 to 1.00%

Mn is an element that prevents cracking during hot rolling and bonds to S to produce MnS that functions as an inhibitor. If the Mn concentration is less than 0.05%, the effect of adding Mn is not sufficiently exhibited. Therefore, the Mn concentration is set to 0.05% or more. The Mn concentration is preferably 0.07% or more, and more preferably 0.09% or more. On the other hand, if the Mn concentration exceeds 1.00%, the precipitation and dispersion of MnS become non-uniform, the required secondary recrystallized structure cannot be obtained, and the magnetic flux density decreases. Therefore, the Mn concentration is set to 1.00% or less. The Mn concentration is preferably 0.80% or less, and more preferably 0.60% or less.

Al: 0.010 to 0.065%

Al is an element that binds to N to produce (Al, Si) N or AlN that functions as an inhibitor. If the Al concentration is less than 0.010%, the effect of adding Al is not sufficiently exhibited and the secondary recrystallization does not proceed sufficiently. Therefore, the Al concentration is set to 0.010% or more. The Al concentration is preferably 0.015% or more, and more preferably 0.020% or more. On the other hand, if the Al concentration exceeds 0.065%, the precipitation and dispersion of the inhibitor become non-uniform, the required secondary recrystallized structure cannot be obtained, and the magnetic flux density decreases. Therefore, the Al concentration is set to 0.065% or less. The Al concentration is preferably 0.050% or less, and more preferably 0.040% or less. Although details will be described later, Al in the base steel sheet also has a function of reacting with a glass coating having a developed fitting structure to form an Al precipitate.

N: 0.004% or Less

N is an element that binds to Al to form AlN that functions as an inhibitor. However, if the N concentration of the final product exceeds 0.004%, N in the steel sheet is precipitated as AlN, which deteriorates the hysteresis loss. Therefore, the N concentration is set to 0.004% or less. The lower limit of the N concentration includes 0%, but if the N concentration is reduced to less than 0.0001%, the manufacturing cost will increase significantly. Therefore, 0.001% is a practical lower limit on the practical steel sheet. In the grain-oriented electrical steel sheet, the N concentration is usually reduced to about 0.001% or less by final annealing.

S: 0.010% or Less

S is an element that binds to Mn to produce MnS that functions as an inhibitor. However, if the S concentration exceeds 0.010% in the final product, S in the steel sheet is precipitated as MnS, which deteriorates the hysteresis loss. Therefore, the S concentration is set to 0.010% or less. The lower limit of the S concentration includes 0%, but if the S concentration is reduced to less than 0.0001%, the manufacturing cost will increase significantly. Therefore, 0.0001% is a practical lower limit on the practical steel sheet. In the grain-oriented electrical steel sheet, the S concentration is usually reduced to about 0.005% or less by final annealing.

In the components of the base steel sheet, the balance excluding the above elements is Fe and impurities. Impurities are basically unavoidable impurities, but when the base steel sheet contains optional additive elements described later, the impurities are composed of these optional additive elements in addition to the unavoidable impurities. The unavoidable impurity is an element that is unavoidably incorporated from the steel raw material and/or in the steelmaking process, and is an element that is allowed within a range that does not impair the characteristics of the grain-oriented electrical steel sheet according to the present embodiment.

Further, in the base steel sheet, one or more of Cr: 0.30% or less, Cu: 0.40% or less, P: 0.50%, or less, Ni: 1.00% or less, Sn: 0.30% or less, Sb: 0.30% or less, B: 0.0100% or less, Mo: 0.1% or less, and Bi: 0.01% or less may be added as an optional additive element for the purpose of enhancing other characteristics without deteriorating the magnetic characteristics. Since these elements are optional additives, the lower limit of the concentration may be 0%.

Cr: 0.30% or Less

Cr is an element that improves the oxide layer in decarburization annealing and is effective for forming a glass coating. Therefore, Cr may be added to the base steel sheet in an amount ranging 0.30% or less. If the Cr concentration exceeds 0.30%, the decarburization property is significantly inhibited. Therefore, the upper limit of the Cr concentration is preferably 0.30%.

Cu: 0.40% or Less

Cu is an element effective in increasing the specific resistance of the base steel sheet and reducing its iron loss. If the Cu concentration exceeds 0.40%, the iron loss reduction effect is saturated and surface defects such as "copper scabby defect" may occur during hot rolling. Therefore, the upper limit of the Cu concentration is preferably 0.40%.

P: 0.50% or Less

P is an element effective in increasing the specific resistance of the base steel sheet and reducing its iron loss. If the P concentration exceeds 0.50%, a problem will occur in rollability. Therefore, the upper limit of the P concentration is preferably 0.50%.

Ni: 1.00% or Less

Ni is an element that is effective in increasing the specific resistance of the base steel sheet and reducing its iron loss. Ni is also an element that is effective in controlling the iron structure of the hot rolled sheet and improving its magnetic properties. However, if the Ni concentration exceeds 1.00%, secondary recrystallization becomes unstable. Therefore, the upper limit of the Ni concentration is preferably 1.00%.

Sn: 0.30% or less, Sb: 0.30% or Less

Sn and Sb are well-known grain boundary segregation elements. Since the base steel sheet according to the present embodiment contains Al, Al may be oxidized by the moisture released from the annealing separator depending on the final annealing conditions, and the inhibitor strength may fluctuate at the coil position. As a result, the magnetic properties may fluctuate at the coil position. As one of the countermeasures, there is a method of preventing the oxidation of Al by adding these grain boundary segregation elements, and for that purpose, Sn and Sb may be added to the base steel sheet at a concentration of 0.30% or less, respectively. On the other hand, if the concentration of these elements exceeds 0.30%, Si is less likely to be oxidized during decarburization annealing, the formation of a glass film becomes insufficient, and the decarburization annealing is significantly impaired. Therefore, the upper limit of the concentration of these elements is preferably 0.30%.

B: 0.0100% or Less

B is an element that binds to N in the base steel sheet and complex-precipitates with MnS to form BN that functions as an inhibitor. The lower limit of the B concentration is not particularly limited and may be 0% as described above. However, in order to fully exert the effect of adding B, the lower limit of the B concentration is preferably 0.0005%. The B concentration is preferably 0.001% or more, and more preferably 0.0015% or more. On the other hand, if the B concentration exceeds 0.0100%, the precipitation and dispersion of BN become non-uniform, the required secondary recrystallized grain texture cannot be obtained, and the magnetic flux density decreases. Therefore, the B concentration is preferably 0.0100% or less. The B concentration is preferably 0.0080% or less, more preferably 0.0060% or less, and more preferably 0.0040% or less.

Mo: 0.1% or Less

Mo is an element that is effective in improving the surface texture during hot rolling. However, if the Mo concentration exceeds 0.1%, the Mo addition effect is saturated. Therefore, the upper limit of the Mo concentration is preferably 0.1%.

Bi: 0.01% or Less

Bi has the effect of stabilizing precipitates such as sulfides and strengthening the function as an inhibitor. However, if the Bi concentration exceeds 0.01%, Bi adversely affects the formation of the glass coating. Therefore, the upper limit of the Bi concentration is preferably 0.01%.

2-3. Oxygen Concentration In Glass Coating and Base Steel Sheet

The total oxygen concentration in the glass coating and the base steel sheet is 2500 ppm or less. Most of the oxygen is contained in the glass coating, and the oxygen contained in the steel sheet is about 10 to 100 ppm. When the grain-oriented electrical steel sheet contains an insulating film described later, the oxygen concentration is measured after the insulating film is removed from the grain-oriented electrical steel sheet. That is, the insulating film is not included in the measurement target of the oxygen concentration. The insulating film is removed using, for example, an aqueous sodium hydroxide solution.

The oxygen analysis method uses a gas analysis method in which a sample is placed in a graphite crucible, the sample is melted and heated, and CO and $CO_2$ are measured by the infrared absorption method.

When the oxygen concentration exceeds 2500 ppm, the magnetic flux density of the base steel sheet decreases (more specifically, the amount of magnetic iron decreases), and the iron loss deteriorates. Therefore, the upper limit of the oxygen concentration is 2500 ppm. The lower limit of the oxygen concentration is not particularly limited, but when the oxygen concentration is extremely low such as 500 ppm or less, a glass coating is not actually formed on the surface of the base steel sheet, and the fitting structure of the glass coating does not develop. Therefore, the iron loss becomes inferior. Furthermore, the adhesion of the insulating film may decrease. Therefore, the oxygen concentration is preferably more than 500 ppm, and more preferably 1000 ppm or more. The oxygen concentration is measured using a gas analyzing device that uses a principle of inert gas melting method. In examples described later, it is a value measured by this method. Examples of a method for setting the oxygen concentration to 2500 ppm or less include decarburization annealing conditions, particularly a method for adjusting the dew point. For example, the oxygen concentration of 2500 ppm or less can be achieved by adjusting the dew point while considering the annealing time and annealing temperature.

2-4. Al Concentration Profile by GDS

When the grain-oriented electrical steel sheet according to the present embodiment is subjected to glow discharge optical emission analysis (GDS), the luminous intensity distribution of Al (Al concentration profile) is observed in the sheet thickness direction. When the grain-oriented electrical steel sheet contains an insulating film described later, the Al concentration profile is measured after removing the insulating film from the grain-oriented electrical steel sheet. That is, the insulating film is not included in the measurement target of the Al concentration profile. The measurement by GDS is performed from the surface of the glass coating.

GDS analysis requires appropriate condition adjustment depending on the sample, and this adjustment is within the range of normal practice for those skilled in the art. Therefore, the measurement conditions of GDS are not limited. However, the output was set to 35 W, and the data was taken at intervals of 0.01 to 0.10 seconds, for example.

The Al concentration profile has at least two peaks. The peaks of each Al are designated as the first peak, the second peak, and so on in order from the side closer to the surface of the glass coating. FIG. 1 shows an example of the Al concentration profile. The Al concentration profile shown in FIG. 1 has two peaks, that is, first peak 1 and second peak 2. The number of peaks is preferably two. The peaks may partially overlap or may be separated from each other.

The first peak is derived from the Al precipitate in the covering portion of the glass coating, and the second peak is derived from the Al precipitate in the fitting structure of the glass coating. The Al precipitate from which each peak is derived is, for example, $Mg_2Al_2O_4$ in which Si of forsterite ($Mg_2SiO_4$) constituting the glass coating is replaced with Al. $MgAl_2O_4$ has a similar composition of constituent elements to forsterite ($Mg_2SiO_4$), has a polymorphic relationship, and is easily produced. However, the Al precipitate is not necessarily limited to $Mg_2Al_2O_4$, and it is not particularly limited as long as it constitutes a magnetic pole in the surface layer portion of the base steel sheet. Examples of other Al precipitates considered in the present embodiment include precipitates in which $MgAl_2O_4$ is substituted with other elements and solid-solved, $Al_2O_3$ precipitates and the like.

Further, when the first peak intensity of Al is $I_{Al\_1}$ and the second peak intensity of Al is $I_{Al\_2}$, the relationship of the mathematical formula (1) is satisfied.

$$I_{Al\_1} < I_{Al\_2} \qquad \text{Formula (1)}$$

That is, the second peak intensity is larger than the first peak intensity. Here, each peak intensity is defined as the maximum intensity of Al luminous intensity at each peak (in other words, the maximum peak height).

Further, the ratio of the first peak intensity to the second peak intensity may be less than 1 by modifying the mathematical formula (1). That is, the relationship of the mathematical formula (1)' is satisfied.

$$I_{Al\_1}/I_{Al\_2}<1 \quad \text{Formula (1)'}$$

The first peak intensity may be 0, and the lower limit of the peak ratio may be 0. The lower limit of the peak ratio is 0.1 or more or more than 0.1, 0.2 or more or more than 0.2, 0.3 or more or more than 0.3, 0.4 or more or more than 0.4, 0.5 or more or more than 0.5, 0.6 or more or more than 0.6, 0.7 or more or more than 0.7, 0.8 or more or more than 0.8, 0.9 or more or more than 0.9.

On the other hand, in general, the stronger the second peak intensity, the closer the peak ratio is to 1, which is preferable. Therefore, the upper limit of the peak ratio is 0.9 or less or less than 0.9, 0.8 or less or less than 0.8, 0.7 or less or less than 0.7, 0.6 or less or less than 0.6, 0.5 or less or less than 0.5, 0.4 or less or less than 0.4.

2-5. Structure of Surface Layer Portion of Base Steel Sheet

As described above, the second peak intensity is larger than the first peak intensity. This is because the filling structure of the glass coating is formed on the surface layer portion of the base steel sheet, and a large amount of Al precipitates are distributed in the filling structure as described in detail later. Therefore, the fitting structure of the glass coating will be described with reference to FIGS. 2 and 3. As described above, FIGS. 2 and 3 show an example of the surface state of the grain-oriented electrical steel sheet according to the present embodiment. In these examples, the grain-oriented electrical steel sheet includes a base steel sheet c) and a glass coating a) formed on the surface of the base steel sheet c). The glass coating a) has a fitting structure that fits into the base steel sheet c), and the fitting structure is much developed. The fitting structure contains Al precipitate b).

As shown in these examples, in the grain-oriented electrical steel sheet according to the present embodiment, a fitting structure of the glass coating is formed at the surface layer portion of the base steel sheet. Moreover, the fitting structure has a very complex three-dimensional network structure. Although Al precipitates appear to be scattered in FIGS. 2 and 3, the Al precipitates are present not only on the plane of the paper surface (that is, on the cross section parallel to the rolling direction of the steel sheet) as shown in FIGS. 2 and 3, but also actually extends in a direction intersecting the paper surfaces of FIGS. 2 and 3 (for example, perpendicular to the paper surface) (that is, in the sheet width direction of the steel sheet), and have a three-dimensional network structure connected to the covering portion. Further, in FIGS. 2 and 3, the fitting structure generally appears to fit from the covering portion toward the surface layer portion of the base steel sheet (that is, to extend in the sheet thickness direction), but the fitting structure may extend in the rolling direction and the sheet width direction. When observing the vertical cross section of this portion, a long fitting structure is observed from the left side to right side (in the rolling direction and the sheet width direction).

The term "surface layer portion of the base steel sheet" in the present embodiment means a region from the surface of the base steel sheet (the interface between the covering portion of the glass coating and the base steel sheet) to a predetermined depth in the base steel sheet. For example, the portion where the fitting structure of the glass coating is formed may be referred to as the surface layer portion of the base steel sheet. Here, the surface of the base steel sheet (the interface between the covering portion of the glass coating and the base steel sheet) generally corresponds to the boundary between the covering portion of the glass coating and the fitting structure, and the boundary is determined by the Al concentration profile. Further, the predetermined depth may be 10 μm from the surface of the glass coating toward the center of the sheet thickness in consideration of the thickness of the glass coating on a general grain-oriented electrical steel sheet.

Furthermore, a part of the fitting structure is composed of Al precipitates. Al precipitates are abundantly distributed at the tip portion of the fitting structure. Here, the tip portion of the fitting structure means an end portion extending in the depth direction at the inner side of the steel sheet in observation in a two-dimensional cross section as shown in FIG. 3, for example. In FIGS. 2 and 3, it can be seen that a large amount of Al precipitates is formed at the tip portion of the fitting structure. Further, in FIGS. 2 and 3, Al precipitates appearing to be scattered substantially spherically in the base steel sheet are formed at the tip portion of the fitting structure extending in the direction intersecting the paper surface (that is, the sheet width direction of the steel plate). Since the fitting structure may further develop at the later stage, the Al precipitates may be present at a portion other than the tip portion of the fitting structure. The specific three-dimensional network structure of the fitting structure is not particularly limited, but the more complicated the fitting structure is, the more Al precipitates are formed in the fitting structure and trapped to be retained therein. In the grain-oriented electrical steel sheet according to the present embodiment, since the fitting structure forms a very complicated three-dimensional network structure, a large amount of Al precipitates is present in the fitting structure. On the other hand, most of the Al precipitates are formed in the fitting structure and are trapped therein, and thus not so much is precipitated in the covering portion of the glass coating. Further, as described above, in the Al concentration profile, the first peak is derived from the Al precipitates in the covering portion of the glass coating, and the second peak is derived from the Al precipitates in the fitting structure of the glass coating. Therefore, in the grain-oriented electrical steel sheet according to the present embodiment, the second peak intensity is larger than the first peak intensity, and the mathematical formula (1) is satisfied. From this, the boundary between the covering portion of the glass coating and the fitting structure can be classified by the Al concentration profile.

The Al precipitate forms an interface at the surface layer portion of the base steel sheet that has a different magnetic permeability from that of the steel sheet. That is, the Al precipitate having a fitting structure fitted into the surface layer portion of the base steel sheet constitutes a magnetic pole. In the grain-oriented electrical steel sheet according to the present embodiment, many Al precipitates, that is, magnetic poles are formed at the surface layer portion of the base steel sheet, so that the magnetic domains are further subdivided.

Figure 4:
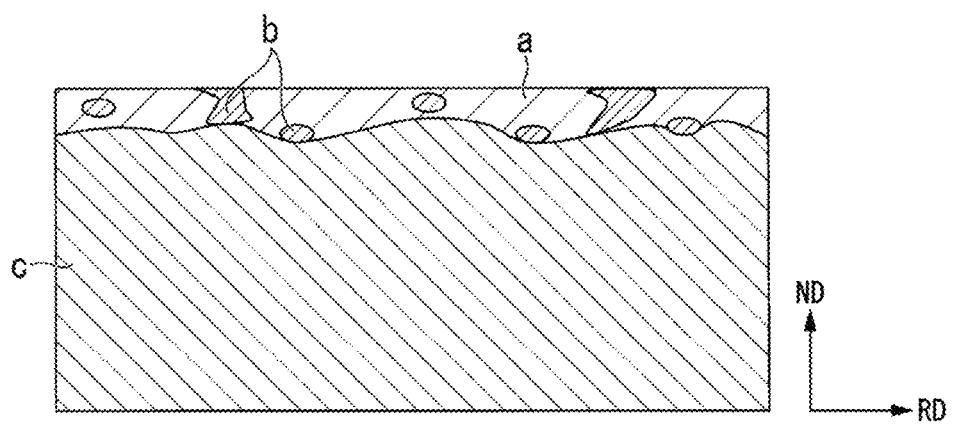
FIG. 4 is a cross-sectional view schematically showing a vertical cross section parallel to the rolling direction of a grain-oriented electrical steel sheet in which a fitting structure of the glass coating is not developed.

An example where the mathematical formula (1) is not satisfied includes, for example, a case where the fitting structure is not developed and the amount of Al precipitates deposited is small. An example of such a grain-oriented electrical steel sheet is shown in FIG. 4. The meaning of each reference symbol in FIG. 4 is the same as that in FIGS. 2 and 3. In the example of FIG. 4, the fitting structure is hardly developed, and therefore the Al precipitate is present almost only in the glass coating (the portion corresponding to the covering portion). In this case, the fitting structure is not developed, and Al precipitates serving as magnetic poles are hardly formed at the surface layer portion of the base steel sheet. Therefore, the magnetic domain subdivision effect cannot be achieved.

2-6. Method of Observing Al Precipitates

The fitting structure of the glass coating is the portion fitted into the surface layer portion of the base steel sheet, and the Al precipitate contained in the filling structure is present in a large amount at the region of the surface layer portion of the base steel sheet from the surface of the glass coating to a depth of 10 μm. Therefore, the Al precipitate can be observed by the following method. That is, of the vertical cross section parallel to the rolling direction of the surface layer portion of the base steel sheet, the region from the surface of the glass coating to a depth of 10 μm (hereinafter, also referred to as "observation region") is observed by an optical microscope or FE-SEM (field emission scanning electron microscope) or the like. Then, the composition of the observation region is analyzed by EDS (energy dispersive X-ray spectroscopy), EPMA (electron probe microanalyzer), or the like. This makes it possible to identify Al precipitates in the observation region. For example, the size and precipitation frequency of Al precipitates, which will be described later, can be measured. Regarding the precipitation frequency, for example, a plurality of photographs of the observation region may be taken, and the precipitation frequency measured in each photograph may be arithmetically averaged.

2-7. Al Precipitate Size and Precipitation Frequency

It is preferable that Al precipitates having a circular equivalent diameter of 1 μm or more are scattered in the observation region at an average frequency of 50 pieces/mm or more in the rolling direction. In this case, the magnetic domain subdivision effect can be further enhanced.

Although the presence of Al precipitates having a circular equivalent diameter of less than 1 μm does not adversely affect the characteristics of the base steel sheet, it is considered that such Al precipitates are unlikely to contribute to the magnetic domain subdivision effect. The upper limit of the circular equivalent diameter of the Al precipitate is not particularly limited. However, if the size of the Al precipitates is too large, the number density of the Al precipitates is relatively reduced, and the iron loss improving effect may be reduced. Therefore, for example, the equivalent circle diameter is preferably 10 μm or less.

If the precipitation frequency of Al precipitates is less than 50 pieces/mm, the frequency of occurrence of magnetic poles decreases, and thus the magnetic domain subdivision effect may be slightly reduced. The upper limit of the precipitation frequency is not particularly limited, but if the precipitation frequency is too high, the Al precipitates may hinder the domain wall movement itself. In this case, the iron loss may be impaired. Therefore, the precipitation frequency is preferably 100 pieces/mm or less.

As described above, according to the grain-oriented electrical steel sheet according to the present embodiment, when the first peak intensity of Al is $I_{Al\_1}$ and the second peak intensity of Al is $I_{Al\_2}$, the relationship of the mathematical formula (1) is satisfied. When the condition of the formula (1) is satisfied, the filling structure of the glass coating is greatly developed, and many Al precipitates are formed in the filling structure, in other words, in the surface layer portion of the base steel sheet. Since these Al precipitates form magnetic poles, the magnetic domain subdivision effect can be sufficiently enhanced by these Al precipitates. The magnetic domain control described later may be further applied to the grain-oriented electrical steel sheet according to the present embodiment. Therefore, according to the present embodiment, the iron loss before the magnetic domain control is further improved, and even in the heat-resistant magnetic domain control in which a sufficient iron loss improving effect is not likely to be obtained, the iron loss improving effect can be sufficiently obtained.

3. Manufacturing Method of Grain-oriented Electrical Steel Sheet

Next, an example of a method for manufacturing the grain-oriented electrical steel sheet according to the present embodiment will be described. The manufacturing method of the grain-oriented electrical steel sheet according to the present embodiment is not limited to the manufacturing method described below, and any manufacturing method can be used as long as it can manufacture the grain-oriented electrical steel sheet according to the present embodiment.

3-1. Outline of Manufacturing Method

Next, the method for manufacturing the grain-oriented electrical steel sheet according to the present embodiment includes a steel slab preparation step, a reheating step, a hot rolling step, a hot band annealing step, a cold rolling step, a decarburization annealing step, a nitriding treatment step, an annealing separating agent coating step, a final annealing step, a purification annealing step, and a cooling step. Hereinafter, each step will be described in detail.

3-2. Steel Slab Preparation Step

In this step, a steel slab will be prepared. Specifically, the steel is melted by, for example, a converter or an electric furnace. The molten steel thus obtained is optionally vacuum degassed, and then continuously cast or ingot-cast, followed by bloom rolled. This gives a steel slab. The thickness of the steel slab is not particularly limited, but is usually cast in the range of 150 to 350 mm, preferably 220 to 280 mm. However, the steel slab may be a so-called thin slab having a thickness range of 30 to 70 mm. When a thin slab is used, there is an advantage that it is not necessary to subject it to a rough processing to the intermediate thickness when manufacturing the hot rolled sheet.

Here, the chemical component of the steel slab is the same as that of the base steel sheet described above except for the mass % of N. Here, only the mass % of N will be described.
N: 0.004 to 0.012%

N is an element that binds to Al to form AlN that functions as an inhibitor. However, N is also an element that forms blister (hole) in the steel sheet during cold rolling. If the mass % of N is less than 0.004%, the formation of AlN is insufficient. Therefore, the N concentration is set to 0.004% or more. It is preferably 0.006% or more, and more preferably 0.007% or more. If the N concentration exceeds 0.012%, many blisters may be formed in the steel sheet during cold rolling. Therefore, the N concentration is set to 0.012% or less.

3-3. Reheating Step

In this step, the steel slab is reheated. The reheating temperature of the steel slab is preferably 1280° C. or lower.

If the reheating temperature exceeds 1280° C., the amount of molten scale increases. Further, since MnS is completely dissolved in the steel slab and finely precipitated in the subsequent steps, it is necessary to set the decarburization annealing temperature to more than 900° C. in order to obtain the desired primary recrystallized grain size. Therefore, in the present embodiment, it is preferable to reheat the steel slab at 1280° C. or lower. The lower limit of the reheating temperature is not particularly limited, but may be, for example, 1100° C.

3-4. Hot Rolling Step, Hot Band Annealing Step

In the hot rolling (hot-rolling) step, the steel slab after reheating is hot rolled. In the hot band annealing step, the iron structure is recrystallized by heating the hot rolled sheet obtained by the hot rolling step as described above to a first stage temperature of 1000 to 1150° C. Then, the hot rolled sheet is annealed at a second stage temperature of 850 to 1100° C. and lower than the first stage temperature. This hot band annealing step is mainly performed for the purpose of homogenizing the non-uniform structure generated during hot-rolling.

That is, in order to homogenize the non-uniform iron structure generated during hot rolling before the final cold rolling, it is essential to perform annealing once or more in the present embodiment. The upper limit of the first stage temperature in this case has a great influence on the inhibitor. For example, if the first stage temperature exceeds 1150° C., the inhibitor is finely precipitated in the subsequent steps. Therefore, the upper limit of the first stage temperature is set to 1150° C. On the other hand, if the first stage temperature is less than 1000° C., recrystallization is insufficient and the iron structure after hot rolling is not uniform. Therefore, the lower limit of the first stage temperature is set to 1000° C. The upper limit of the second stage temperature also has a great influence on the inhibitor. For example, if the second stage temperature exceeds 1100° C., the inhibitor is finely precipitated in the subsequent steps. Therefore, the upper limit of the second stage temperature is set to 1100° C. If the second stage temperature is less than 850° C., the y phase is not generated, and thus iron structure cannot be made uniform. Therefore, the lower limit of the second stage temperature is set to 850° C. Further, it is necessary to control the second stage temperature to a value lower than the first stage temperature.

3-5. Cold Rolling Step

After performing the hot band annealing step, the hot rolled sheet is subjected to one cold rolling or two or more cold rollings (cold rollings) with an intermediate annealing therebetween. As a result, the final cold rolled sheet is produced. Each cold rolling may be carried out at room temperature, or may be warm rolling in which the temperature of the steel sheet is raised to a temperature higher than room temperature, for example, about 200° C.

3-6. Decarburization Annealing Step

The decarburization annealing step includes at first a heating step of heating the steel sheet after the cold rolling step (cold rolled sheet) from an inlet side temperature t0° C. to a soaking temperature t2° C. higher than the inlet side temperature, and a soaking step of maintaining a temperature of the cold rolled sheet at the soaking temperature t2° C. for a predetermined time. The decarburization annealing step is performed in a moist atmosphere. Here, the inlet side temperature t0° C. is a temperature at which the cold rolled sheet is introduced into the annealing furnace, and it is generally 600° C. or lower. The soaking temperature is a temperature in the range of 700 to 900° C.

The soaking step (the process of maintaining a temperature of 700 to 900° C. for a predetermined time) of the decarburization annealing is performed for the purpose of removing carbon in steel and controlling the primary recrystallized grain size to a desired grain size. The soaking step is preferably carried out at a soaking temperature of t2° C. in a temperature range of 700° C. to 900° C. for a period such that the primary recrystallized grain size is 15 µm or more. If the soaking temperature t2° C. is less than 700° C., the desired primary recrystallized grain size cannot be achieved, and if the soaking temperature t2° C. exceeds 900° C., the primary recrystallized grain exceeds the desired grain size.

In the decarburization annealing step, the primary recrystallized texture (specifically, the crystal orientation in the texture) can be controlled by controlling a heating rate in the heating process. In the primary recrystallized texture, it is preferable to reduce {111} azimuth grains and increase the {411} azimuth grains and the Goss azimuth grains. The ease of recrystallization differs depending on the crystal orientation, and the {411} azimuth grains are most likely to recrystallize at a heating rate of around 100° C./sec, and the Goss azimuth grains are more likely to recrystallize in proportion to the heating rate. Therefore, in the present embodiment, it is preferable to heat at the heating rate HR1 of 40° C./sec or more, preferably 75° C./sec or more, more preferably 75 to 125° C./sec, from t0° C., where the steel sheet temperature is 600° C. or lower, to t2° C. (temperature in the soaking zone), which is in the range of 700 to 900° C. This makes it possible to reduce the {111} azimuth grains and increase the {411} azimuth grains and the Goss azimuth grains. Although details will be described later, $SiO_2$ can be formed and developed at the surface layer portion of the steel sheet by controlling the heating rate HR1 to 40° C./sec or more in the temperature range of t0 to t2. That is, an internal oxide layer containing a large amount of $SiO_2$ can be formed at the surface layer portion of the steel sheet. HR1 is an average heating rate from t0° C. to t2° C., and the heating rate may fluctuate in a part of the heating process and temporarily become less than 40° C./sec.

Furthermore, in the heating step, the heating rate may be changed between the first half and the second half.

In one embodiment, the decarburization annealing step includes a heating step of heating the cold rolled sheet from an inlet side temperature t0° C. of 600° C. or lower to a soaking temperature t2° C. higher than the inlet side temperature t0° C. and a soaking step of maintaining the temperature of the cold rolled sheet at the soaking temperature t2° C. In the heating step of the decarburization annealing step, the heating rate hr1 is set to 40° C./sec or more wherein the temperature of the cold rolled sheet is within the range of the inlet side temperature from t0° C. to 700 to 900° C. and until it reaches the desired temperature t1° C. lower than the soaking temperature t2° C. The heating rate hr2 may be over 15° C./sec to 30° C./sec until the temperature of the cold rolled sheet reaches the soaking temperature t2° C. from the desired temperature t1° C.

Specifically, as shown in FIG. 5, the heating rate hr1 in a temperature range wherein the temperature of the cold rolled sheet is within the range of the inlet side temperature from t0° C. to 700 to 900° C. and until it reaches the desired temperature t1° C. lower than the soaking temperature t2° C.

(that is, in the rapid heating temperature range) is set to 40° C./sec or more, and the heating rate hr2 in a temperature range until the temperature of the cold rolled sheet reaches the soaking temperature t2° C. from the desired temperature t1° C. is set to more than 15° C./sec to 30° C./sec. The desired temperature t1° C. may be arbitrarily set within the range in which the above conditions are satisfied, but by setting the desired temperature t1° C. to be equal to or lower than the Curie point (750° C.) of the steel sheet, heating in the temperature range from the inlet temperature t0° C. to the desired temperature t1° C. (in the rapid heating temperature range) can be performed by an induction heating device.

Here, the heating rate hr1 may be 40° C./sec or more, and preferably 75 to 125° C./sec.

In the present embodiment, the heating rate hr1 from the inlet side temperature t0° C. to the soaking temperature t1° C. is set to 40° C./sec or more. This makes it possible to reduce the {111} azimuth grains and increase the {411} azimuth grains and the Goss azimuth grains. The heating rate hr1 is preferably 75° C./sec or higher, and more preferably 75 to 125° C./sec.

Further, in the present embodiment, the heating rate hr2 in a temperature range from the desired temperature t1° C. to the soaking temperature t2° C. may be set to more than 15° C./sec to 30° C./sec. The lower limit of the heating rate hr2 is preferably 16° C./sec. As such, in the present embodiment, the heating rate hr2 after the temperature of the cold rolled sheet reaches the desired temperature t1° C. may be set to a relatively high value of more than 15° C./sec to 30° C./sec. As a result, it is possible to obtain a primary recrystallized grain texture in which the frequencies of {411} azimuth grains and Goss azimuth grains are high, and the crystal grain size of the Goss azimuth grains is increased. As a result, the secondary recrystallized grain size is reduced in the secondary recrystallization by the subsequent final annealing. Therefore, a grain-oriented electrical steel sheet having a good iron loss can be obtained.

Here, the reason why the above effect is obtained when the heating rate hr2 is controlled to more than 15° C./sec to 30° C./sec is not clear, but the present inventors consider the reason as follows. That is, in the temperature range from the desired temperature t1° C. to the soaking temperature t2° C. (the soaking temperature is 700 to 900° C.) for the rapid heating, recrystallization of unrecrystallized grains and grain growth of crystal grains that have already been recrystallized will occur. At the soaking temperature of t2° C., all the unrecrystallized grains become recrystallized grains. After that, in the soaking step (soaking annealing) at the soaking temperature of t2° C., the recrystallized grains enter a grain growth mode, the azimuth grains having a small crystal grain size are encroached, and the azimuth grains having a large crystal grain size increase their size. Here, the Goss azimuth grains have already completed recrystallization at the desired temperature of t1° C. or lower. The grain growth of the Goss azimuth grain that has already completed recrystallization will be promoted by controlling the heating rate hr2 from the desired temperature t1° C. to the soaking temperature t2° C. at more than 15° C./sec to 30° C./sec, and preferably 16° C./sec or more and 30° C./sec or less. That is, since the Goss azimuth grains are already large-diameter crystal grains at the start of the soaking step, they can exist without being encroached by other azimuth grains in the soaking step.

Here, if the heating rate hr2 is 15° C./sec or less, the growth of the crystal grains in the azimuth of recrystallization after the desired temperature t1° C. compete with the growth of the Goss azimuth grains, and the Goss azimuth grains cannot grow sufficiently. As a result, the frequency of Goss azimuth grains decreases in the primary recrystallized grain texture, and an electrical steel sheet having good iron loss characteristics cannot be obtained. On the other hand, if the heating rate hr2 is more than 30° C./sec, the frequency and crystal grain size of the Goss-azimuth grains become extremely large in the primary recrystallized grain texture, and the sizing property (uniformity) of the entire texture is significantly impaired. Therefore, stable secondary recrystallized grains cannot be obtained, and as a result, the iron loss characteristics deteriorate.

Further, the upper limit of hr2 may be no higher than 25° C. or lower than 25° C. The range of hr2 can be achieved by heating using various heating devices as described in detail later. However, if the hr2 becomes too large and overshoots the soaking temperature t2, it may lead to subsequent secondary recrystallization failure. Therefore, by setting the upper limit of hr2 to no higher than 25° C. or lower than 25° C., it is possible to prevent overshooting the soaking temperature t2, which is preferable.

3-6-1. Heating Method in Decarburization Annealing Step

The heating in the heating step during the decarburization annealing step may be performed by induction heating. In this case, the flexibility of the heating rate is high, the steel sheet can be heated in a non-contact manner, and the effect of being relatively easy to install in the decarburization annealing furnace can be obtained.

In particular, if a heating rate is changed between the first half and the second half, and the desired temperature t1° C. is no higher than 750° C., which is the Curie point of the steel sheet, the cold rolled sheet can be rapidly heated from the inlet side temperature t0° C. to the desired temperature t1° C. only by an induction heating device.

On the other hand, heating from the desired temperature t1° C. to the soaking temperature t2° C. and the soaking treatment in the subsequent soaking step may be performed using a heating device using a radiant heat source such as a radiant tube. It is difficult to heat with an induction heating device after the Curie point, but a heating device using a radiant heat source can stably heat a cold rolled sheet even in such a temperature range. Further, heating by radiant heat has an advantage that it is easy to control within the range of the heating rate hr2 (within the range slower than the heating rate hr1).

Of course, the heating method is not particularly limited. In addition to the above-mentioned method, the heating method may be a method using a high-energy heat source such as a new laser or plasma, a method using an energization heating device, or the like. It is also possible to combine these as appropriate. However, by using an induction heating device or a heating device using a radiant heat source, there is an advantage that the cold rolled sheet can be heated without the heating device coming into direct contact with the cold rolled sheet.

Here, the method for measuring the heating rate of HR1, HR2 (described later), hr1, hr2, etc. is not particularly limited, and it can be calculated by measuring the temperature of the steel sheet using, for example, a radiation thermometer or the like. However, if it is difficult to measure the steel sheet temperatures t0, t1, t2, etc., and it is difficult to estimate the exact points of the start and end points of HR1, HR2, hr1, hr2, etc., these points may be estimated by analogizing each heat pattern in the temperature rise process.

3-7. Nitriding Treatment Step

After the decarburization annealing, the steel sheet is subject to nitriding treatment so that the nitrogen concentration of the steel sheet is 40 ppm or more and 1000 ppm or less. If the nitrogen concentration of the steel sheet after the nitriding treatment is less than 40 ppm, AlN is not sufficiently precipitated in the steel sheet, and AlN does not function as an inhibitor. Therefore, the nitrogen concentration of the steel sheet is set to 40 ppm or more. On the other hand, if the nitrogen concentration of the steel sheet exceeds 1000 ppm, excess AlN is present in the steel sheet even after the completion of secondary recrystallization in the final annealing. Such AlN causes deterioration of iron loss. Therefore, the nitrogen concentration of the steel sheet is set to 1000 ppm or less.

3-8. Annealing Separator Application Step

After the nitriding treatment step, an annealing separator is applied to the surface of the steel sheet. Final annealing as described later may be performed in a state where the steel sheet is wound into a coil. If the final annealing is performed in such a state, the coil may be baked to be seized and it may be difficult to unwind the coil. Therefore, in the present embodiment, an annealing separator is applied so that the coil can be unwound after final annealing. Here, the main component of the annealing separator is MgO, and MgO in the annealing separator undergoes a solid-phase reaction with $SiO_2$ in the internal oxide layer during final annealing to form forsterite ($Mg_2SiO_4$) and form a glass coating.

3-Final Annealing Steps

The final annealing step is an annealing, which is also called a secondary recrystallization annealing step, and is a process for promoting secondary recrystallization of the iron structure. In the final annealing step, the steel sheet is heated to about 1200° C. as described later. Here, in the heating process, it is preferable that the heating rate HR2 is 15° C./h or less in the temperature range of at least 1000° C. to 1100° C. Further, instead of controlling the heating rate, it is also effective to keep the temperature within the temperature range of 1000° C. to 1100° C. for 10 hours or more. That is, the heating rate in this temperature range is extremely slowed down. As a result, preferential growth (secondary recrystallization) of Goss azimuth can be promoted. If the heating rate HR2 is too fast (more than 15° C./h), crystal grains having a crystal azimuth other than the Goss azimuth will grow. The heating rate in other temperature ranges is not particularly limited and may be about the same as that of the conventional final annealing.

The final annealing step is performed in a mixed atmosphere of nitrogen and hydrogen. Further, in the present embodiment, the nitrogen concentration (nitrogen partial pressure) is controlled to be gradually lowered in the heating process. Specifically, when the temperature range of 700 to 900° C. is referred to as T2, the temperature range of 800 to 1000° C. is referred to as T3, and the temperature range of 900 to 1200° C. is referred to as T4, the nitrogen partial pressure P0 from room temperature to T2 (T2 or less) is 60 to 90%, nitrogen partial pressure P1 from T2 to T3 (more than T2 and T3 or less) is 40 to 60%, and nitrogen partial pressure P2 from T3 to T4 (more than T3 and T4 or less) is 10 to 40%. At this time, T2<T3<T4 and P0>P1>P2. The details will be described later, but by gradually lowering the nitrogen partial pressure in this way, the filling structure of the glass coating can be greatly developed. When T4 is set to a temperature lower than 1200° C., the nitrogen partial pressure P2 at T4 to 1200° C. is 0% (hydrogen partial pressure 100%).

3-10. Purification Annealing Step

In the purification annealing step following the final annealing step, the precipitates (AlN, MnS, etc.) used as an inhibitor are detoxified by purification after the completion of the secondary recrystallization. This makes it possible to reduce the hysteresis loss in the final magnetic characteristics. In the purification annealing step, for example, it is preferable to retain the steel sheet at 1200° C. for 10 hours or more in a hydrogen atmosphere.

3-11. Cooling Step

After the purification annealing step, the steel sheet is cooled. Here, it is preferable that the cooling rate (temperature lowering rate) CR in the temperature range (T5) of 1200 to 1000° C. is 30 to 100° C./h. The cooling rate CR is more preferably 30 to 50° C./h. Although the details will be described later, the fitting structure can be further developed by lowering the cooling rate CR.

By the above-mentioned step, the grain-oriented electrical steel sheet according to the present embodiment can be produced. The reason why the grain-oriented electrical steel sheet according to the present embodiment can be produced by each of the above-mentioned steps is not clear, but the present inventors generally consider the reason as follows.

First, in the heating process of the decarburization annealing step, by controlling the heating rate HR1 in the temperature range of t0 to t2 at 40° C./sec or more, an internal oxide layer containing a large amount of $SiO_2$ can be formed in the surface layer portion of the steel sheet before final annealing.

Next, in the final annealing step, forsterite ($Mg_2SiO_4$) is produced by the solid-phase reaction between $SiO_2$ in the internal oxide layer and MgO in the annealing separator. Then, the forsterite is accumulated on the surface of the steel sheet to form a glass coating. As a result, a glass coating is formed on the surface of the steel sheet (base steel sheet). Here, as described above, in the final annealing step, the nitrogen partial pressure is gradually lowered from a high partial pressure to a low partial pressure at 700 to 1200° C. As a result, MgO in the annealing separator also stably reacts with $SiO_2$ existing at a deeper position in the internal oxide layer to generate forsterite. That is, the glass coating is fitted into the surface layer portion of the base steel sheet, and the fitting structure is formed. Furthermore, the fitting structure is developed as the generated forsterite experiences Ostwald growth. Specifically, the three-dimensional network structure of the fitting structure becomes complicated, and the branches constituting the fitting structure become thicker.

On the other hand, at a temperature of about 1000° C. or higher, N is separated while AlN, which is an inhibitor in the base steel sheet, floats toward the glass coating side. Thereafter, Al reaching the tip portion of the fitting structure reacts with forsterite in the fitting structure to generate an Al precipitate ($MgAl_2O_4$ or the like). This Al precipitate is trapped in the fitting structure and is retained therein. Further, in the cooling step, by controlling the cooling rate CR in the temperature range (T5) of 1200 to 1000° C. in the range of 30 to 100° C./h, the Ostwald growth of Al precipitates constituting the fitting structure is promoted, and the fitting structure is further developed. Here, the branches of the Al precipitate become complicated and thick. The Al precipitates that are abundantly distributed in this filling structure correspond to the second peak of the Al concentration profile. A large portion of the Al separated from AlN which is an inhibitor in the base steel sheet, forms an Al precipitate in the filling structure, but a part of the separated Al reaches a portion other than the filling structure of the glass coating, that is, a covering portion, and Al precipitates are formed in the covering portion of the glass coating. The Al precipitate present in this glass coating corresponds to the first peak of the Al concentration profile. Therefore, the second peak derived from the Al precipitate of the filling structure is larger than the first peak derived from the Al precipitate of the glass coating. That is, the Al precipitate grows in the fitting structure and develops in the surface layer portion of the base steel sheet such that the mathematical formula (1) is satisfied. FIGS. 2 and 3 show an example in which the fitting structure is developed (that is, the mathematic formula (1) is satisfied), and FIG. 4 shows an example in which the fitting structure is not developed (that is, the mathematic formula (1) is not satisfied).

Here, the lower the cooling rate CR, the more the fitting structure is developed. That is, the lower the cooling rate CR, the higher the precipitation frequency of Al precipitates, and consequently reaches 50 pieces/mm or more.

After performing each of the above steps, an insulating film coating step and a magnetic domain control step may be further performed.

3-12. Insulating Film Coating

The surface of the steel sheet after the cooling step is coated with an insulating film coating and it is baked. The type of the insulating film is not particularly limited, and any conventionally known insulating film is suitable for the grain-oriented electrical steel sheet of the present embodiment. Examples of the insulating film include a film formed by applying an aqueous coating solution containing a phosphate salt and a colloidal silica. In this case, examples of the phosphate salt include phosphates such as Ca, Al, and Sr phosphates. Of these, the aluminum phosphate salt is more preferable. The colloidal silica is not particularly limited, and the particle size thereof can be appropriately determined. A particularly preferable particle size (average particle size) is 200 nm or less. Even if the particle size is less than 100 nm, there is no problem in dispersion, but the manufacturing cost becomes high and it may not be realistic. If the particle size exceeds 200 nm, it may be precipitated in the treatment liquid.

It is preferable to apply the insulating film coating liquid to the surface of the steel sheet by a wet coating method such as a roll coater and bake it in an air atmosphere at a temperature of 800 to 900° C. for 10 to 60 seconds to form a tension insulating film.

3-13. Magnetic Domain Control Step

The specific processing method for the magnetic domain control step is not particularly limited, and lower iron loss can be obtained by performing magnetic domain control by, for example, laser irradiation, electron beam, etching, or a groove forming method using gears. As described above, the iron loss is greatly improved in the grain-oriented electrical steel sheet according to the present embodiment even before the magnetic domain control. Therefore, even if the heat-resistant magnetic domain control is performed in which a sufficient iron loss improving effect is not likely to be obtained, the iron loss improving effect can be sufficiently obtained.

EXAMPLES

Next, examples of the present invention will be described. The condition in the examples is one condition example adopted for confirming the feasibility and effect of the present invention, and the present invention is not limited to this one condition example. The present invention can adopt various conditions as long as the gist of the present invention is not deviated and the object of the present invention is achieved.

1. Example 1

In Example 1, the steel slab having the component composition shown in Table 1 was heated to 1150° C. and then subjected to hot rolling to obtain a hot rolled sheet having a sheet thickness of 2.6 mm. Then, the hot rolled sheet was subject to hot band annealing with the first-stage temperature set to 1100° C. and the second-stage temperature set to 900° C. Then, the hot rolled sheet was subjected to one cold rolling or a plurality of times of cold rolling with intermediate annealing therebetween to prepare a cold rolled sheet having a final sheet thickness of 0.23 mm.

TABLE 1

| | Steel No. | Chemical Component (mass %) | | | | | | |
|---|---|---|---|---|---|---|---|---|
| | | C | Si | Mn | Al | N | S | Others |
| Inv. Example | A1 | 0.0021 | 3.45 | 0.080 | 0.010 | 0.0031 | 0.0012 | |
| | A2 | 0.0032 | 3.33 | 0.150 | 0.012 | 0.0020 | 0.0013 | Cu 0.02 |
| | A3 | 0.0034 | 2.55 | 0.190 | 0.011 | 0.0016 | 0.0008 | Cr 0.1 |
| | A4 | 0.0022 | 2.90 | 0.090 | 0.011 | 0.0017 | 0.0009 | P 0.0125 |
| | A5 | 0.0028 | 3.50 | 0.090 | 0.060 | 0.0018 | 0.0011 | Ni 0.1 |
| | A6 | 0.0076 | 3.95 | 0.080 | 0.041 | 0.0018 | 0.0019 | |
| | A7 | 0.0034 | 3.30 | 0.080 | 0.020 | 0.0021 | 0.0012 | Bi 0.001 |
| | A8 | 0.0021 | 3.10 | 0.120 | 0.028 | 0.0009 | 0.0017 | |
| | A9 | 0.0019 | 3.12 | 0.100 | 0.018 | 0.0011 | 0.0012 | B 0.001 |
| | A10 | 0.0023 | 3.30 | 0.250 | 0.011 | 0.0019 | 0.0013 | |
| | A11 | 0.0025 | 3.45 | 0.150 | 0.051 | 0.0021 | 0.0011 | |
| | A12 | 0.0023 | 3.40 | 0.120 | 0.045 | 0.0032 | 0.0012 | Mo 0.05 |
| | A13 | 0.0022 | 3.80 | 0.500 | 0.035 | 0.0031 | 0.0011 | |
| | A14 | 0.0020 | 3.40 | 0.150 | 0.038 | 0.0039 | 0.0031 | |
| | A15 | 0.0030 | 3.40 | 0.180 | 0.021 | 0.0012 | 0.0095 | Cu 0.2 |

TABLE 1-continued

|  | Steel No. | Chemical Component (mass %) | | | | | | |
|---|---|---|---|---|---|---|---|---|
|  |  | C | Si | Mn | Al | N | S | Others |
|  | A16 | 0.0031 | 3.30 | 0.190 | 0.001 | 0.0011 | 0.0028 |  |
|  | A17 | 0.0023 | 3.60 | 0.100 | 0.010 | 0.0011 | 0.0027 |  |
| Comp. Example | a1 | 0.1200 | 3.35 | 0.12 | 0.021 | 0.0022 | 0.0023 |  |
|  | a2 | 0.0022 | 3.35 | 2.50 | 0.011 | 0.0018 | 0.0032 | Bi 0.001 |
|  | a3 | 0.0012 | 3.00 | 0.03 | 0.011 | 0.0018 | 0.0031 |  |
|  | a4 | 0.0013 | 3.25 | 0.15 | 0.125 | 0.0015 | 0.0030 |  |
|  | a5 | 0.0021 | 3.10 | 0.07 | 0.001 | 0.0022 | 0.0045 |  |
|  | a6 | 0.0021 | 3.20 | 0.08 | 0.021 | 0.0150 | 0.0065 | Cu 0.2 |
|  | a7 | 0.0015 | 3.34 | 0.12 | 0.025 | 0.0021 | 0.0200 |  |
|  | a8 | 0.0031 | 6.50 | 0.09 | 0.023 | 0.0022 | 0.0021 | P 0.025 |
|  | a9 | 0.0032 | 1.20 | 0.12 | 0.033 | 0.0017 | 0.0032 |  |

Next, the cold rolled sheet having a final sheet thickness of 0.23 mm was subjected to decarburization annealing and nitriding treatment (annealing to increase an amount of nitrogen in the steel sheet). The heating rate HR1 in decarburization annealing was set to 100° C./s. The heating method was a radiant tube method. Here, t0 was 550° C. and t2 was 840° C. In the soaking temperature range, the temperature t2 was maintained for 100 seconds. The nitrogen concentration was 200 to 2500 ppm and analysis was performed by the method described in JIS G 1228.

After that, an annealing separator containing magnesia (MgO) as a main component was applied to the surface of the steel sheet, and a final annealing was performed. In the final annealing step, the steel sheet was heated to 1200° C. Here, the heating rate in the temperature range of 1000 to 1100° C. was set to 10° C./h. Further, regarding the annealing atmosphere, the nitrogen partial pressure P0 up to 800° C. (up to T2) was 80%, the nitrogen partial pressure P1 up to 1000° C. (up to T3) was 50%, and the nitrogen partial pressure P2 up to 1200° C. (up to T4) was set to 20%. However, the annealing atmosphere of Comparative Examples b10 and b11 was the atmosphere described later. Purification was at 1200° C. for 10 hours.

In the subsequent cooling step, the steel sheet was cooled at a cooling rate CR of 60° C./h in the temperature range (T5) from 1200° C. to 1000° C. However, the cooling rate CR of Comparative Examples b12 and b13 was set to a value described later. A grain-oriented electrical steel sheet was produced by the above steps.

Next, the oxygen concentration of the grain-oriented electrical steel sheet was measured, and the Al concentration profile was further measured by GDS. Here, the oxygen concentration was analyzed by the method described in JIS G 1239. The GDS had an output of 35 W, and data was acquired at 0.01 second intervals. The results are shown in Table 2.

Then, an aqueous coating liquid composed of a phosphate salt and a colloidal silica was applied to the steel sheet, and the steel sheet was baked in air at 800° C. for 60 seconds. As a result, a tension insulating film was formed on the surface of the steel sheet (more specifically, on the surface of the glass coating). Then, the iron loss $W_{17/50}$ (energy loss measured under excitation conditions of 1.7 T and 50 Hz) of the grain-oriented electrical steel sheet to which the tension insulating film was applied was measured. The measurement was carried out according to JIS C 2550. The results are shown in Table 2.

TABLE 2

|  | No. | Steel No. | Oxygen Concentration in Glass Coating Film and Base Steel Sheet (ppm) | GDS Al Peak Strength Ratio $I_{Al\_1}/I_{Al\_2}$ | Magnetic Property Iron Loss W17/50 (W/kg) | Comments |
|---|---|---|---|---|---|---|
| Inv. Example | B1 | A1 | 2102 | 0.8 | 0.82 |  |
|  | B2 | A2 | 2322 | 0.5 | 0.81 |  |
|  | B3 | A3 | 1988 | 0.6 | 0.79 |  |
|  | B4 | A4 | 1878 | 0.9 | 0.81 |  |
|  | B5 | A5 | 1965 | 0.7 | 0.82 |  |
|  | B6 | A6 | 1988 | 0.5 | 0.80 |  |
|  | B7 | A7 | 1899 | 0.4 | 0.81 |  |
|  | B8 | A8 | 1789 | 0.7 | 0.78 |  |
|  | B9 | A9 | 2103 | 0.9 | 0.79 |  |
|  | B10 | A10 | 2122 | 0.7 | 0.80 |  |
|  | B11 | A11 | 2133 | 0.8 | 0.82 |  |
|  | B12 | A12 | 2100 | 0.5 | 0.83 |  |
|  | B13 | A13 | 2187 | 0.6 | 0.82 |  |
|  | B14 | A14 | 1999 | 0.5 | 0.79 |  |
|  | B15 | A15 | 1989 | 0.5 | 0.78 |  |
|  | B16 | A16 | 2102 | 0.5 | 0.82 |  |
|  | B17 | A17 | 2018 | 0.6 | 0.78 |  |
| Comp. Example | b1 | a1 | 2009 | 0.5 | 1.85 | No Secondary Recrystallization |
|  | b2 | a2 | 2678 | 1.1 | 2.02 | No Secondary Recrystallization |
|  | b3 | a3 | 1798 | 0.7 | 0.95 | Iron Loss X |
|  | b4 | a4 | 1980 | 0.9 | 1.35 | No Secondary Recrystallization |
|  | b5 | a5 | 1887 | 5 | 1.65 | No Secondary Recrystallization |

TABLE 2-continued

| No. | Steel No. | Oxygen Concentration in Glass Coating Film and Base Steel Sheet (ppm) | GDS Al Peak Strength Ratio $I_{Al\_1}/I_{Al\_2}$ | Magnetic Property Iron Loss W17/50 (W/kg) | Comments |
|---|---|---|---|---|---|
| b6 | a6 | 1909 | 2 | 0.98 | Iron Less X |
| b7 | a7 | 2198 | 0.6 | 0.99 | Iron Loss X |
| b8 | a8 | — | — | — | Termination of Rolling |
| b9 | a9 | 2878 | 1.1 | 0.96 | Iron Loss X |
| b10 | A1 | 2872 | 0.9 | 0.88 | |
| b11 | A5 | 2677 | 1.1 | 0.89 | |
| b12 | A7 | 2532 | 1.2 | 0.88 | |
| b13 | A8 | 1899 | 1.3 | 0.87 | |

In Inventive Examples B1 to B17 that satisfy all the requirements (component composition, oxygen concentration, and formula (1) regarding Al concentration profile) of the grain-oriented electrical steel sheet according to the present embodiment, the iron loss of 0.85 W/kg or less, which is good magnetic property have been obtained.

On the other hand, in Comparative Examples b1, b2, b4 and b5, since a steel slabs in which the mass % of a part of the component composition was out of the range of the present embodiment were used, secondary recrystallization did not occur and their iron losses exceeded 1.0 W/kg and were significantly inferior. In Comparative Examples b3 and b9, since steel slabs in which the mass % of a part of the component composition was less than the range of the present embodiment were used, their intrinsic resistances were small and their iron losses were 0.9 W/kg or more, which were inferior. In Comparative Examples b6 and b7, since steel slabs in which a part of mass % of the component compositions exceeded the range of the present embodiment were used, impurities remained in the slabs and their iron losses were 0.9 W/kg or more, which were inferior. In Comparative Example b8, since a steel slab in which the mass % of a part of the component composition was out of the range of the present embodiment was used, the steel sheet after reheating became brittle and rolling had to be terminated. In Comparative Examples b10 and b11, the nitrogen partial pressure P0 up to 800° C. (up to T2) was 50%, the nitrogen partial pressure P1 up to 1000° C. (up to T3) was 50%, and the nitrogen partial pressure P2 up to 1200° C. (up to T4) was 50% with respect to the final annealing atmosphere. That is, the nitrogen partial pressure was kept constant. Therefore, the fitting structure of the glass coating was not developed, and the iron loss was more than 0.85 W/kg, which was inferior. In Comparative Examples b12 and b13, the cooling rate CR in the temperature range (T5) from 1200° C. to 1000° C. was set to 150° C./h in the cooling step after final annealing. Therefore, the filling structures of the glass coating, particularly Al precipitates were not developed, and their iron losses were more than 0.85 W/kg, which were inferior.

2. Example 2

In Example 2, the steel slab having the component composition shown in Table 1 was heated to 1150° C. and then subjected to hot rolling to obtain a hot rolled steel sheet having a sheet thickness of 2.6 mm. Then, the hot rolled sheet was subject to hot band annealing with the first-stage temperature set to 1100° C. and the second-stage temperature set to 900° C. Then, the hot rolled sheet was subjected to one cold rolling or a plurality of cold rollings with intermediate annealing therebetween to prepare a cold rolled sheet having a final sheet thickness of 0.23 mm.

Then, the cold rolled steel sheet having a final sheet thickness of 0.23 mm was subjected to decarburization annealing and nitriding treatment (annealing to increase the amount of nitrogen in the steel sheet). The heating rate HR in decarburization annealing was 100° C./s. The heating method was a radiant tube method. Here, t0 was 580° C. and t2 was 860° C. In the soaking temperature range, the temperature t2 was maintained for 120 seconds. The nitrogen concentration is 220 to 260 ppm, and analysis was performed by the method described in JIS G 1228.

After that, an annealing separator containing magnesia (MgO) as a main component was applied to the surface of the steel sheet, and final annealing was performed. In the final annealing step, the steel sheet was heated to 1200° C. Here, the heating temperature in the temperature range of 1000 to 1100° C. was set to 10° C./h. Here, the annealing atmosphere and the cooling rate CR in the subsequent cooling step were varied for each of the inventive examples. Specifically, regarding the annealing atmosphere of Inventive Examples C1 to C3 (see Table 3), the nitrogen partial pressure P0 up to 800° C. (up to T2) was set to 90%, the nitrogen partial pressure P1 up to 1000° C. (up to T3) was set to 60%, and the nitrogen partial pressure P2 up to 1200° C. (up to T4) was set to 30%. In the subsequent cooling step, the cooling rate CR in the temperature range (T5) from 1200° C. to 1000° C. was set to 100° C./h.

On the other hand, regarding the annealing atmosphere of Inventive Examples C4 to C17 (see Table 3), the nitrogen partial pressure P0 up to 800° C. (up to T2) was set to 75%, and the nitrogen partial pressure P1 up to 1000° C. (up to T3) was set to 50%, and the nitrogen partial pressure P2 up to 1200° C. (up to T4) was set to 30%. Further, the cooling rate CR in the temperature range (T5) from 1200° C. to 1000° C. was set to 40° C./h.

After that, the oxygen concentration of the grain-oriented electrical steel sheet was measured in the same manner as in Example 1, and the Al concentration profile was further measured by GDS. Here, the oxygen concentration was analyzed by the method described in JIS G 1239. Further, in Example 2, the cross section of the grain-oriented electrical steel sheet was also observed. Specifically, in the vertical cross section parallel to the rolling direction of the surface layer portion of the base steel sheet, a region from the surface of the glass coating to a depth of 10 μm, that is, an observation region was photographed with an optical microscope. The magnification at the time of photographing was 400 times, and 10 images were taken for each sample. Then, the composition of the observation region in each image was analyzed by SEM-EDS to identify the composition in the observation region. By measuring the precipitation frequency (precipitation frequency in the rolling direction) of Al precipitates having a circular equivalent diameter of 1 μm or more from each of the 10 images and arithmetically averaging these, the precipitation frequency of Al precipitates (number frequency) in each sample was calculated. The results are shown in Table 3.

Then, an aqueous coating liquid composed of a phosphate salt and a colloidal silica was applied to the steel sheet, and the steel sheet was baked in air at 800° C. for 60 seconds. As a result, a tension insulating film was formed on the surface of the steel sheet (more specifically, the surface of the glass coating). Then, the iron loss $W_{17/50}$ (energy loss measured under excitation conditions of 1.7 T and 50 Hz) of the grain-oriented electrical steel sheet to which the tension insulating film was applied was measured. The measurement was carried out based on JIS C 2550. The results are shown in Table 3.

TABLE 3

| | No. | Steel No. | Oxygen Concentration in Glass Coating Film and Base Steel Sheet (ppm) | GDS Al Peak Strength Ratio $I_{Al\_1}/I_{Al\_2}$ | Precipitates Al Presence yes/no | Precipitates Number Frequency (pieces/mm) | Magnetic Property Iron Loss W17/50 (W/kg) |
|---|---|---|---|---|---|---|---|
| Inv. Example | C1 | A1 | 2201 | 0.8 | yes | 38 | 0.83 |
| | C2 | A2 | 2098 | 0.4 | yes | 49 | 0.84 |
| | C3 | A3 | 2187 | 0.6 | yes | 48 | 0.83 |
| | C4 | A4 | 1998 | 0.8 | yes | 70 | 0.79 |
| | C5 | A5 | 1987 | 0.7 | yes | 52 | 0.80 |
| | C6 | A6 | 2019 | 0.5 | yes | 65 | 0.78 |
| | C7 | A7 | 2032 | 0.5 | yes | 88 | 0.79 |
| | C8 | A8 | 1887 | 0.7 | yes | 91 | 0.76 |
| | C9 | A9 | 1987 | 0.9 | yes | 89 | 0.77 |
| | C10 | A10 | 1987 | 0.8 | yes | 89 | 0.78 |
| | C11 | A11 | 2298 | 0.8 | yes | 98 | 0.80 |
| | C12 | A12 | 2090 | 0.9 | yes | 56 | 0.80 |
| | C13 | A13 | 2187 | 0.6 | yes | 67 | 0.80 |
| | G14 | A14 | 2301 | 0.7 | yes | 76 | 0.77 |
| | C15 | A15 | 1898 | 0.5 | yes | 77 | 0.76 |
| | C16 | A16 | 1898 | 0.8 | yes | 71 | 0.80 |
| | C17 | A17 | 1798 | 0.6 | yes | 77 | 0.76 |

The iron loss of Inventive Examples C4 to C17 satisfying the precipitation frequency of Al precipitates of 50 pieces/mm or more was 0.80 W/kg or less, which is better than that of Inventive Examples C1 to C3 having the precipitation frequency of Al precipitates of less than 50 pieces/mm. Because the cooling rates in Inventive Examples C4 to C17 are lower than the cooling rates in Inventive Examples C1 to C3, it is estimated that such a result was obtained.

Although the preferred embodiments of the present invention have been described in detail with reference to the accompanying drawings, the present invention is not limited to such examples. It will be evident that a person with an ordinary skill in the art to which the present invention belongs can clearly come up with various changes or modifications within the scope of the technical ideas described in the claims. These are also naturally understood to belong to the technical scope of the present invention.

EXPLANATION OF SYMBOLS

1: First Peak of Al
2: Second Peak of Al
a: Glass coating ($Mg_2SiO_4$)
b: Al Precipitate
c: Base Steel Sheet

The invention claimed is:

1. A grain-oriented electrical steel sheet comprising a base steel sheet and a glass coating that is formed on a surface of the base steel sheet,
characterized in that the base steel sheet contains as chemical components, in mass %, 0.010% or less of C, from 2.00% to 4.00% of Si, from 0.05% to 1.00% of Mn, from 0.010% to 0.065% or less of Al, 0.004% or less of N and 0.010% or less of S, with a balance of Fe and impurities;
an oxygen concentration in the glass coating and the base steel sheet is more than 500 ppm and 2,500 ppm or less; and
a concentration profile of Al obtained by glow discharge optical emission spectrometry (GDS) has at least two peaks,
in which each Al peak is set as a first peak and a second peak in order from a side closer to a surface of the glass coating opposite from the base steel sheet, and when $I_{Al\_1}$ is the first peak intensity of Al and $I_{Al\_2}$ is the second peak intensity of Al, formula (1) is satisfied, $$I_{Al\_1} < I_{Al\_2} \qquad \text{Formula (1)}.$$

2. The grain-oriented electrical steel sheet according to claim 1, characterized in that in a vertical cross section of a surface layer portion of the base steel sheet in a thickness direction, which is parallel to a rolling direction of the base steel sheet, a region within a range from the surface of the glass coating to a depth of 10 μm in a direction to a center of a thickness of the base steel sheet comprises Al-containing precipitates having a circular equivalent diameter of 1 μm or more and being scattered in the rolling direction at an average frequency of 50 pieces/mm or more.

* * * * *